United States Patent
Goyal

(10) Patent No.: US 9,846,783 B2
(45) Date of Patent: *Dec. 19, 2017

(54) MULTISCREEN SECURE CONTENT ACCESS

(71) Applicant: Citrix Systems, Inc., Fort Lauderdale, FL (US)

(72) Inventor: Ashish Goyal, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,952

(22) Filed: Oct. 27, 2016

(65) Prior Publication Data

US 2017/0046527 A1  Feb. 16, 2017

Related U.S. Application Data

(63) Continuation of application No. 14/643,049, filed on Mar. 10, 2015, now Pat. No. 9,565,176.

(51) Int. Cl.
*G06F 21/62* (2013.01)
*H04L 29/06* (2006.01)
(Continued)

(52) U.S. Cl.
CPC .......... *G06F 21/62* (2013.01); *G02B 27/017* (2013.01); *G06F 3/14* (2013.01); *H04L 63/04* (2013.01); *H04L 63/0492* (2013.01); *H04L 63/08* (2013.01); *H04L 63/12* (2013.01); *H04W 4/02* (2013.01); *H04W 4/023* (2013.01); *H04W 12/02* (2013.01); *G02B 2027/014* (2013.01)

(58) Field of Classification Search
CPC .. H04L 63/08; H04L 63/0861; H04L 63/0428

USPC ........................................................ 726/4
See application file for complete search history.

(56) References Cited

U.S. PATENT DOCUMENTS 8,195,198 B1  6/2012  Shaw et al.
8,966,656 B2  2/2015  Hirsch et al.
(Continued)

FOREIGN PATENT DOCUMENTS

EP  2741480 A1  6/2014

OTHER PUBLICATIONS

Nov. 16, 2015—(WO) International Search Report and Written Opinion—App PCT/US2015/031941.
(Continued)

*Primary Examiner* — Izunna Okeke
*Assistant Examiner* — Hee Song
(74) *Attorney, Agent, or Firm* — Banner & Witcoff, Ltd.

(57) ABSTRACT

Methods and systems for securely accessing content irrespective of the security of the environment in which the content is being accessed are described herein. In some embodiments, a mobile computing device may determine whether secure enterprise content is being accessed on a mobile computing device. In response to determining that a private user device (e.g., virtual reality or augmented reality headwear/eyewear), is communicatively coupled to the mobile computing device, the mobile computing device may prevent the secure content from display on the mobile computing device and instead generate the secure enterprise content for presentation in an unencrypted form on the private user device.

20 Claims, 8 Drawing Sheets

(51) Int. Cl.
*H04W 4/02* (2009.01)
*H04W 12/02* (2009.01)
*G02B 27/01* (2006.01)
*G06F 3/14* (2006.01)

(56) References Cited

U.S. PATENT DOCUMENTS

| | | |
|---|---|---|
| 2012/0183137 A1 | 7/2012 | Laughlin |
| 2013/0070924 A1 | 3/2013 | Bertin |
| 2014/0139439 A1* | 5/2014 | Park .................... G06F 3/04886 345/169 |
| 2014/0299660 A1* | 10/2014 | Melzer .................... G06F 3/011 235/375 |
| 2014/0337621 A1 | 11/2014 | Nakhimov |
| 2014/0337634 A1* | 11/2014 | Starner ................. H04L 9/3231 713/186 |
| 2014/0351896 A1 | 11/2014 | Koo |
| 2015/0062159 A1* | 3/2015 | Hildreth ............. G02B 27/0172 345/633 |
| 2015/0106631 A1* | 4/2015 | Bettendorff ............ G06F 21/00 713/193 |

OTHER PUBLICATIONS

Mar. 8, 2016—U.S. Non-Final Office Action—U.S. Appl. No. 14/643,049.

Jul. 25, 2016—U.S. Final Office Action—U.S. Appl. No. 14/643,049.

\* cited by examiner

MULTISCREEN SECURE CONTENT ACCESS

CROSS-REFERENCE TO RELATED CASES

This application is a continuation of application Ser. No. 14/643,049, filed Mar. 10, 2015, entitled "Multiscreen Secure Content Access," herein incorporated by reference for all purposes.

FIELD

Aspects described herein generally relate to data access in mobile applications. More specifically, aspects described herein relate to techniques for providing access to secure content by mobile device users irrespective of the security of the environment in which the content is being consumed.

BACKGROUND

More and more people are using mobile devices in personal and business settings for a variety of purposes. These devices are often used by individuals to send and receive emails, manage appointments, share media files, consume media content, and perform a plethora of other activities, sometimes from remote or unusual locations. As these devices continue to grow in popularity and provide an increasing number of business applications, enterprise mobile applications are providing employees with means to access networked enterprise applications from their mobile device. Users are able to access their emails, documents, and other mobile applications across multiple different devices with the advent of cloud-based applications and devices.

As mobile users spend time in public places, they access sensitive content by frequently checking email, notes, and opening sensitive documents on their mobile devices. Mobile users who create and read documents in public places access various confidential and secure content on their mobile devices. Currently, such consumers of secure content on mobile devices risk exposing the secure content to the public if they access such content on their mobile devices in public because the secure content is still displayed in plain view and/or played back on the users' mobile devices. When users access such secure content in a public setting, any bystander may be able to view and/or listen to the secure content. Such confidential content may even be stolen without knowledge of the mobile user when someone close to the mobile device takes a photograph, video, and/or audio recording of the confidential content accessed on the user's mobile device in public. Conventional systems do not allow an employee to access such secure data in a public setting without exposing the content to any nearby onlookers. Thus, users must currently decide between the risk of exposing sensitive and confidential content and being productive when they are in a public setting.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards managing the nature in which secure content is presented to mobile devices that only the intended user can access and to mobile devices on which the presented content is visible to the public.

A first aspect described herein provides a method of determining whether secure enterprise content is being accessed on a mobile computing device. In response to determining that a private user device is communicatively coupled to the mobile computing device, the secure enterprise content may be prevented from being presented in an unencrypted form on the mobile computing device. Additionally, the private user device may be instructed to generate the secure enterprise content for presentation in an unencrypted form.

In some embodiments, the private user device may be a head-mounted display device configured to place a display screen in physical proximity to a wearer's eye and visible only to the wearer.

In some embodiments, non-secure content may be generated for presentation in an unencrypted form on the mobile computing device. In order to prevent the secure enterprise content from being presented in an unencrypted form, the secure enterprise content may be generated for presentation in an encrypted form on the mobile computing device. The secure enterprise content may be generated for presentation in an encrypted form in response to determining that the mobile computing device is in a public environment and in response to determining that a secure mode to encrypt secure enterprise content on the mobile computing device has been enabled. The secure enterprise content may be generated for presentation in an encrypted form upon determining which content is to be presented on the mobile computing device and upon determining which portion of the content to be presented on the mobile computing device comprises the secure enterprise content. Upon making such determinations, the portion of the content to be presented that comprises the secure enterprise content may be encrypted.

In some embodiments, the private user device may be instructed to collect authentication information from the user of the private user device. The authentication information may be received from the private user device and the authentication information received from the private user device may be used to authenticate the user of the private user device.

In some embodiments, in order to instruct the private user device to generate the secure enterprise content for presentation in an unencrypted form, it may be determined that the user of the private user device has been authenticated. Upon user authentication has been completed, the secure enterprise content may be generated into an unencrypted presentable form. The secure enterprise content may be transmitted to the private user device.

In some embodiments, user input may be received at the mobile computing device. In response to receiving user input, it may be determined whether any additional content is to be generated for presentation based on the received user input. In response to determining that additional content is to be generated based on the received user input, a determination may be made as to which portion of the additional content generated for presentation comprises additional secure enterprise content. The portion of the additional content to be presented that comprises the additional secure enterprise content may be encrypted. The additional secure enterprise content may be for presentation in an encrypted form on the mobile computing device. Upon determining that the user of the private user device has been authenticated, the additional secure enterprise content may be generated into an unencrypted presentable form. The additional secure enterprise content may be transmitted to the private user device for presentation in an unencrypted form.

An additional aspect described herein provides an apparatus having one or more processors, one or more display screens, and memory storing instructions that, when executed by at least one of the processors cause the computing device to perform the method set forth above. Another aspect described herein provide non-transitory computer-readable media that, when executed, causes a computing device to perform the method set forth above.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
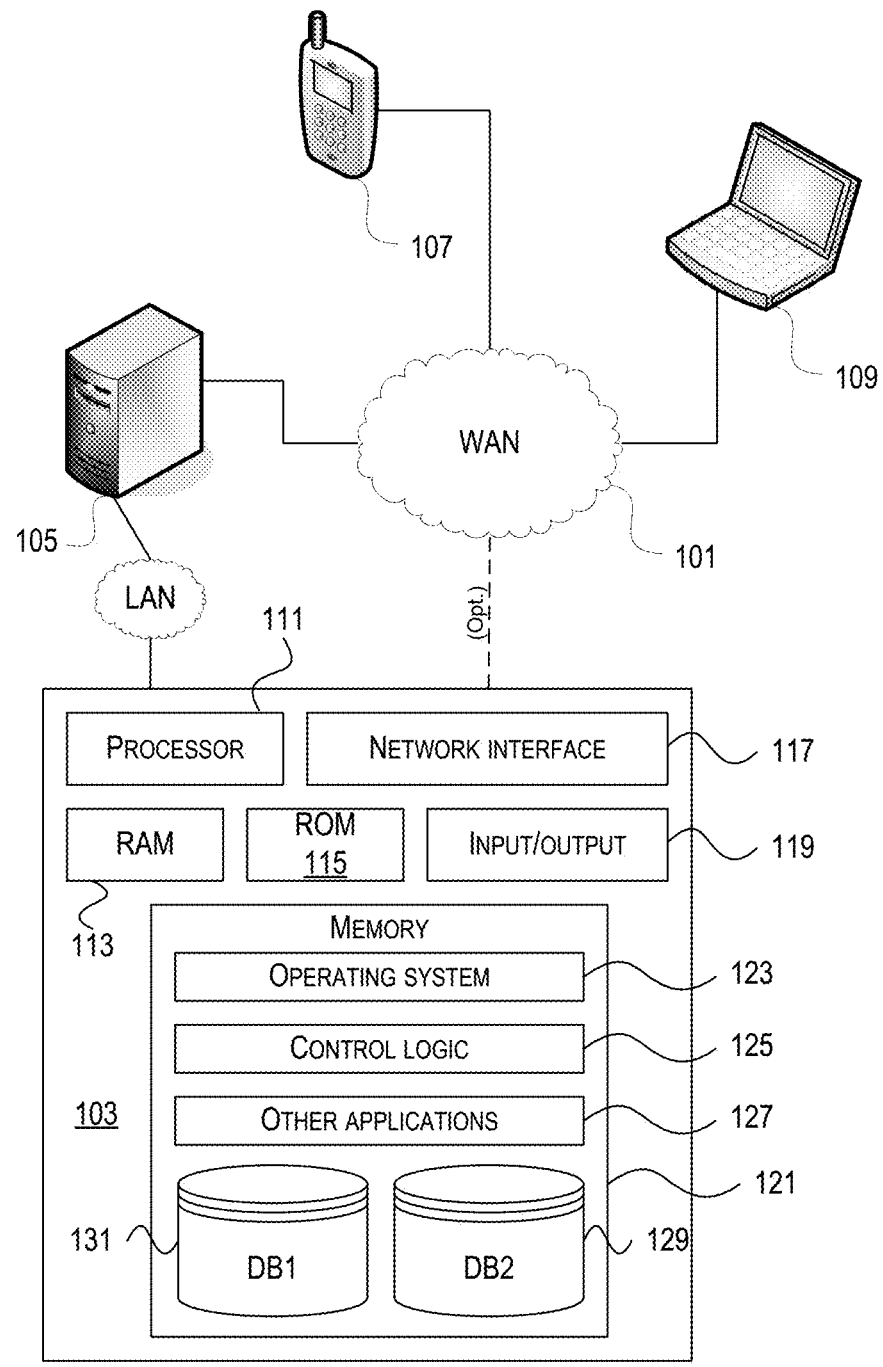
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards managing the nature in which secure content is presented to mobile devices that only the intended user can access and to mobile devices on which the presented content is visible to the public. Mobile users currently accessing secure content on publicly visible mobile devices, whether in the form of email, enterprise mobile applications, secure web browsers, and/or document files carry the risk of exposing the secure content to others nearby within range of the publicly visible mobile device. Hereinafter the terms "publicly visible mobile device," "public user device," and "publicly accessible mobile device" may be used to refer to mobile devices on which content is either graphic content that is displayed and which can be seen and/or perceived by others and/or mobile devices on which audio content can be overheard by other people in addition to the mobile device user (e.g., a mobile device on which audio is outputted speakers and/or a mobile device that is not connected to headphones or earphones). Tablet computing devices, smartphones, laptops, smartwatches, personal digital assistants, portable music players, pagers, etc. that present content in a non-discriminating manner to anyone within range are examples of publicly accessible mobile devices. Because mobile users often want to access secure content on their mobile devices, whenever such secure content is accessed in a public environment (e.g., coffee shop, park, public transit, shopping center, or any other location that is not a private office setting), the mobile user risks exposure of the secure content to nearby onlookers and parties looking to steal and/or record the secure content. While private mobile devices currently exist that allow presentation of content to only their respective users, such private mobile devices do not have the ability to access to the same functionalities of a publicly accessible user device such as a smartphone, tablet, or laptop. Hereinafter, the terms "private mobile device" and "private user device" may refer to mobile devices that only allow their respective user with access to content that is presented on them. Personal head mounted display devices such as Google Glass, Oculus Rift, Samsung Gear VR, Sony HMZ-T3, personal media players that are connected to headphones are examples of private user devices since any content that is presented on these private user devices cannot be accessed or perceived by a bystander and is only consumed by the intended user. However, these personal user devices often do not have the full computing and networking capabilities as public user devices and must often be communicatively coupled with public user devices to be able to access content that is accessible on the public user device. In such scenarios, content presented on the public user device is duplicated on the private user device. Thus, even when private user devices are communicatively coupled with public user devices to access the secure content on the private user device, the secure content is still presented on the public user device, thereby risking exposure of the secure content to a bystander.

The present disclosure describes methods and systems for providing secure content to public devices that are coupled with private devices such that the secure content is presented in an encrypted format on the public user device while the same secure content is presented to only the intended user through the private user device in an unencrypted format. Once the private device has been successfully paired with a public user device, its user has been authenticated, and a security mode is enabled on the public user device to prevent the unencrypted presentation of secure content, the secure content may be displayed in an encrypted view on the public user device and also in an unencrypted view on the private user device. A security manager module, which may be implemented at least partially or completely on the publicly visible user device, may manage which content presented on the publicly visible is to be encrypted and may also manage the decryption of such content for presentation on the private device.

A user of the publicly visible user device may interact with the presented content on the private device and generate additional content as a result of such interaction. The user may generate and/or modify the presented content by providing feedback through a user interface device, the publicly visible user device, or the private user device. The security manager may receive content generated in response to the user feedback and may encrypt such content for presentation in the publicly visible user device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Data server 103 may be a mobile device connected to web server 105 and client computers 107 and 109 through network 101. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
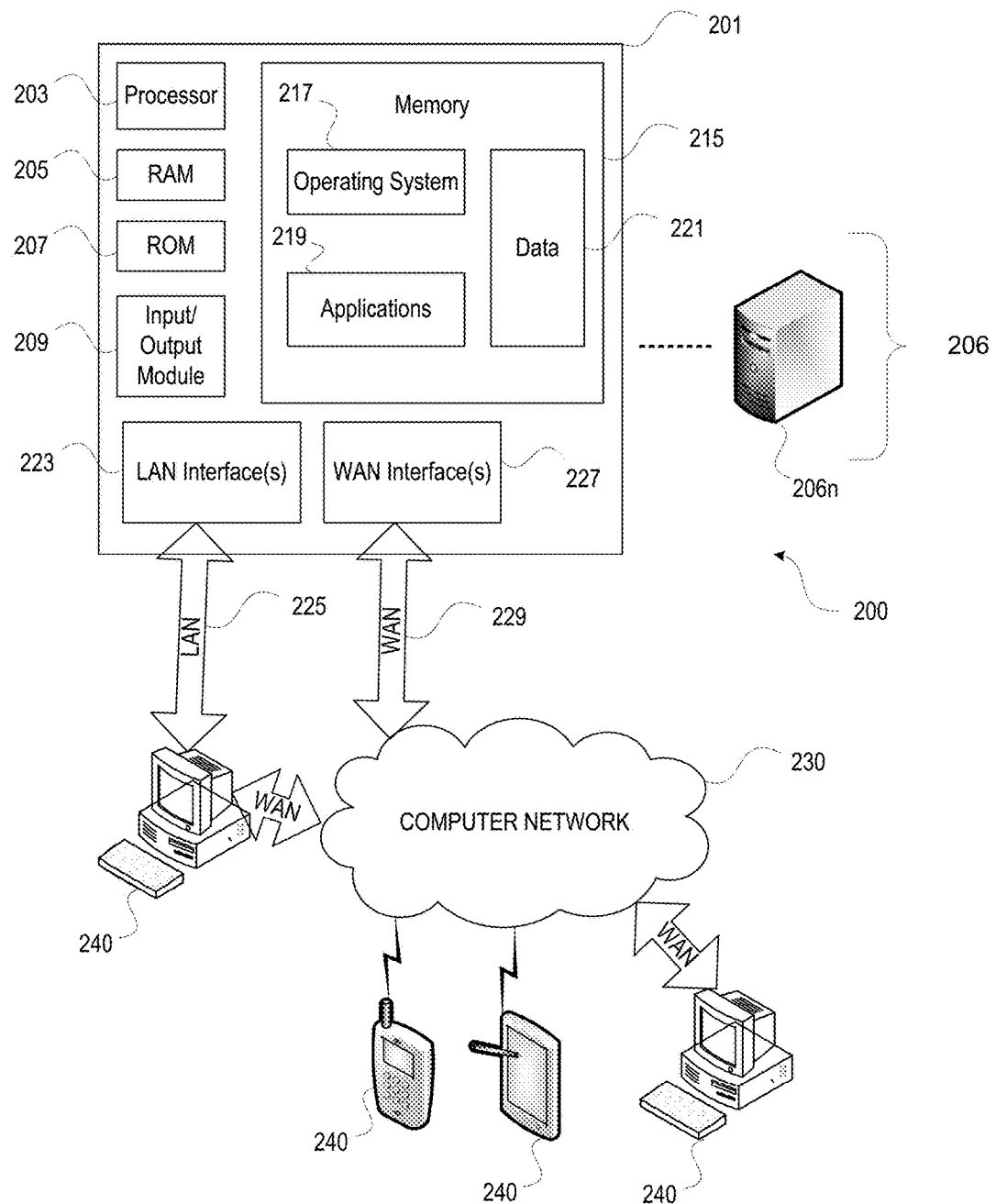
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be a mobile computing device configured to provide access to managed applications to its users in a secure environment. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206. In some embodiments, computing device 201 may be a mobile client device in communication with other client machine(s) 240.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrative Secure Content Presentation Environment

Figure 3:
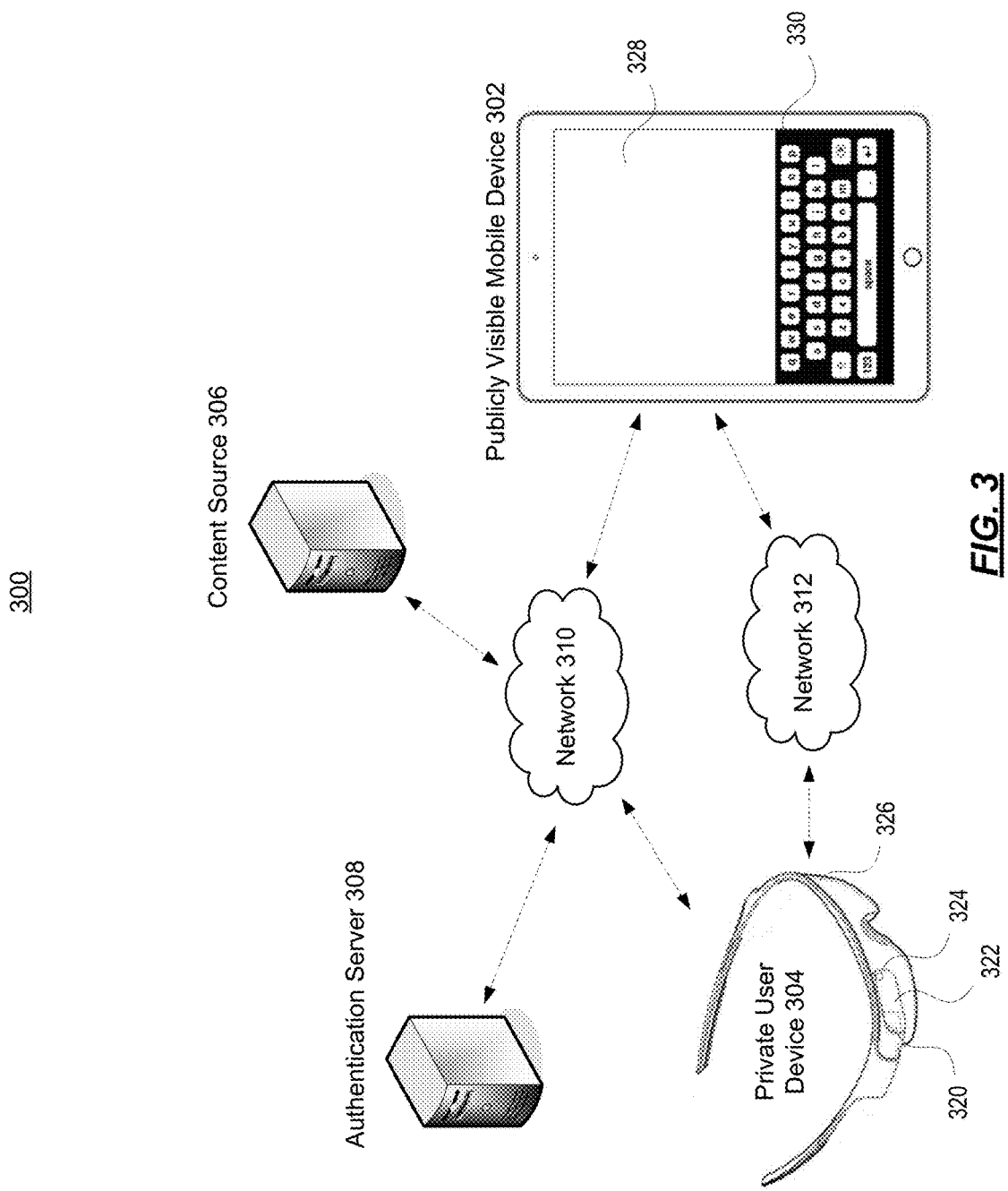
FIG. 3 depicts an illustrative network computing environment for presenting secure content to the intended user in a public setting in accordance with one or more illustrative aspects described herein.

FIG. 3 illustrates an example of an illustrative networked computing environment 300 on which one or more embodiments described in this disclosure may be implemented. Secure content to be presented on a user device such as the publicly visible mobile device 302 may be received from a content source 306 over network 310. The content source 310 may be an enterprise server remotely located from the publicly visible mobile device 302 that provides the mobile device 302 with audiovisual content. The publicly visible mobile device 302 may correspond to data processing device 103 of FIG. 1 and computing device 201 of FIG. 2. The publicly visible mobile device 302 may be communicatively coupled with one or more private user devices such as private user device 304 over network 312. The private user device 304 may authenticate its user by communicating directly or indirectly with an authentication server 308. For example, the publicly visible mobile device 302 may act as a gateway device that coordinates at least a portion of the authentication process for the private user device 304 and the authentication server 308. The publicly visible mobile device 302 may present secure content to the user in both a secure mode and in a regular non-encrypted mode. Once the user of the private user device 304 has been authenticated and a secure mode has been enabled on the publicly visible user device 302, the publicly visible mobile device 302 may communicate with the private device 304 to enable secure content received from the content server 306 to be presented on the private user device 304 in an unencrypted mode while simultaneously presenting the same secure content on the publicly visible user device 302 in an encrypted manner that is indecipherable to the public.

The mobile device 302 may be a mobile computing device on which several different mobile applications such as email, internet browsers, productivity mobile applications and secured enterprise applications managed by a mobile device management system may be implemented. Sensitive enterprise information may be received at the mobile device 302 from any content source 306 over network 310. The mobile device 302 may be a publicly visible mobile device (e.g., tablet, smartphone, laptop, PDA, etc.) that a mobile user may use in a public setting outside of a private office space to access and work remotely on confidential documents. The mobile device 302 may prompt the user to login to an enterprise mobility management system in order to access secure enterprise information as described in greater detail with relation to FIG. 4 below. The user of the mobile device 302 may access secure enterprise mobile applications that allow the user to be able to access secure data in public when the mobile device 302 is communicatively coupled to a private user device 304. For example, an enterprise application implementing on the mobile device 302 may, upon startup, detect that the mobile device 302 is a publicly visible mobile device and detect that the mobile user has indicated that he is in public (e.g., by detecting that secure mode has been enabled on the mobile device 302). Upon detecting that a secure mode has been enabled on the publicly visible mobile device 302, secure content that is received on mobile device 302 for presentation to the user may be prevented from being presented in an unencrypted manner. For example, if the secure content is audiovisual in nature, the secure graphical content may be encrypted and displayed in an encrypted manner such that anyone viewing the secure graphic content will not be able to decipher it as intelligible content. Additionally or alternatively, the mobile device 302 may generate a display message stating that the content the mobile device user is attempting to access is confidential and not permitted to be displayed on the mobile device 302. Additionally or alternatively, the mobile device 302 may not display the secure content and instead display a blank screen on the portion of the mobile device 302 display screen that would otherwise have displayed the secure content. Similarly, any audio portion of the audiovisual secure content may be encrypted such that playback over the speakers of the mobile device 302 will render an unintelligible audio stream instead of the content. Alternatively, the audio portion of the mobile device may be muted or simply be replaced by a message stating the content is private.

In some embodiments, secure mode may be enabled on the publicly visible mobile device 302 automatically in order to prevent presentation of secure content in a public setting. The mobile device 302 may activate secure mode upon detecting that the mobile device is located (e.g., by identifying the current location of the mobile device 302 using GPS and/or local area networks) outside an area that has been designated to be a private area (e.g., the user's office or private residence). The mobile device may also detect that the wireless network that it is connected to differs from the networks associated with the user's home and/or office networks and may accordingly enable secure mode in response to the change in wireless network access to the mobile device 302. In other embodiments, the user may manually activate secure mode by interacting with a graphic user interface (GUI) element displayed on the mobile device 302 or by pressing a button on the mobile device 302.

The mobile device 302 may communicate with content source 306 to obtain secure content for presentation to the mobile user. Content source 306 may be one or more remote servers and/or computing devices that the mobile device 302 communicates with in order to present both secure and ordinary content to the mobile user. Content source 306 may be an enterprise server such as an Exchange or SharePoint server or it may be remotely located database that is accessible over network 310. The network 310 may be a local area network or a wireless network (e.g., WiFi) that enables the mobile device 302 to access the one or more content sources 306. For example, the network 310 may allow the mobile device 302 to access various different remote databases and servers over the Internet. The content source 306 may be an application database that communicates with a specific mobile application on the mobile device 302 and provides secure content to the mobile user device through within the framework of a mobile application.

The private user device 304 may be a mobile computing device through which only the intended user is able to consume content. The private user device 304 may be a wearable computing device such as a head mounted display worn on the head or as part of a helmet, that has a small display screen in front of one or both eyes of the user. The private user device 304's display panel 322 may be a display screen that is placed within physical proximity of one or more of the wearer's eye. The contents of the display panel 322 may be visible only to the wearer (e.g., user) of the private user device 304. The private user device 304 may also be an optical head-mounted display capable of reflecting projected images onto the private user device 304 as well as allowing the user to see through the projected images to generate an augmented reality experience for the user of the private user device 304. In addition to wearable head mounted displays, the private user device 304 may also be a headset that delivers audio only to its intended user and records feedback from the user using a microphone embedded in the headset. Although the embodiments described throughout this disclosure describe the private user device 304 through the example of an optical head mounted display, the private user device 304 may be any device that is able to deliver content to only its intended user even when the user is in public surrounded by many other individuals.

In the example shown in FIG. 3, the private user device 304 may be an optical head mounted display. The private user device 304 may include an optical projector 320 that outputs optical signals onto the display panel 322 to generate an image that will be reflected to the eyes of the private device 304's user. The display panel 322 may be a reflective panel (e.g., liquid crystal on silicon, reflective coating etc.) that reflects the optical signals projected by the optical projector 320. The private user device 304 may receive data from the mobile device 304. Such data from the mobile device 304 may include audiovisual signals needed to generate an image and audio for presentation on the private user device 304. Additionally or alternatively, the private user device 304 may receive digital signals including packets of information that need to be processed by a processor on board the private user device in order to generate an image and/or audio signal to be presented on the private user device. Once an image has been generated, the optical projector 320 may project the determined video signal onto the display panel 322. Since the user of the private user device 304 is wearing the optical head-mounted device, only he can see the image reflected on the display panel 322 even if the user is in public. The private user device 304 may also include one or more optical sensors such as camera 324 that may be used to capture feedback from the user of the private user device 304. In the example shown in FIG. 3, the display panel 322 of the private user device 304 may be placed on a head mounted frame 326. The head mounted frame 326 may also be connected to eyeglass lens so that the user of the private user device 304 may be able to view the surrounding environment while simultaneously viewing image projected onto the display panel 322.

In some embodiments, the user of the private user device 304 may be authenticated in order for the user to be able to view the secure content in an unencrypted manner on the private user device 304 in public when secure mode has been activated. The mobile device 302 may communicate with the user of the private user device 304 to display an authentication prompt on the display panel 322 of the private user device 304. The mobile device 302 may communicate with an authentication server 308 in order to verify the credentials entered by the user of the private user device. The user of the private user device 304 may enter his or her login credentials using a user input device communicatively coupled with the mobile device 302 and/or on a user interface of the mobile device 302. The mobile device may communicate with the authentication server in order to verify the user's login credentials. Additionally or alternatively, the user of the private user device may be authenticated using the camera 324. For example, the camera 324 may take an image of the user, a user gesture, or the user's retina. Such an image of the user, the user gesture, or the retinal scan of the user may be transmitted to the authentication server 308 through the mobile device 302 and compared against a database to verify that the user of the private user device 304 is indeed allowed to access the secure content being received from the content source 306. Once such an authentication is performed, the authentication server may provide the mobile device 302 with the encryption keys needed to decrypt the encrypted secure content received from the content source 306.

Once a private user device 304 has been detected and authenticated by the mobile device 304, secure content received from the content source 306 may be processed for presentation at the private user device 304 in an unencrypted manner and the mobile device 302 in an encrypted manner. For example, a security manager component executing on the mobile device 302 may detect that a secure mode has been enabled on the mobile device 302 indicating that the mobile device 302 is in a public environment and that secure content presented on it needs to be encrypted to be prevented from being viewed and stolen by bystanders. Accordingly, the mobile device 302 may identify which portions of a display screen and/or mobile application fields are to display secure content and accordingly encrypts the content to be displayed in such an area of the mobile device. Similarly, the mobile device 302 may identify which audio component of an audio content to be presented at the mobile device 302 contains secure content and encrypts such content. After the security manager has encrypted such secure content, the mobile device 302 may present the encrypted content on the mobile device. The mobile device 302 may present (e.g., display or playback audio) content that is not determined to include any secure content in an unencrypted manner while the secure content is presented in an encrypted manner on the mobile device 302. For example, the mobile device 302 may present graphic user interface elements (text box, taskbar, mobile application GUI, button, etc.) that do not contain any secure information and may only encrypt the secure content (e.g., text and/or media content) that is presented on the mobile device 302.

In some embodiments, the mobile device 302 may instruct the private user device 304 to present the content that is being presented on the mobile device 302 in an unencrypted manner. For example, once the mobile device 302 is communicatively coupled with the private user device 304, the mobile user device 302 may transmit audio, graphic, video signals, and instructions on how to manipulate such signals to present the content on the private user device 304. In some embodiments, the mobile device 302 may instruct the private user device 304 to duplicate the content presented on the mobile device 302 in an unencrypted manner. For example, if the mobile device 302 displays an email application with an email containing secure data, the mobile device 302 may provide the private user device 304 with the necessary graphic information and instructions required to generate the display of the mobile email application and its associated GUI components along with the unencrypted secure content. In some other embodiments, the mobile device 302 may instruct the private user device 304 to display certain parts of what is displayed on the mobile device 302. For example, the mobile device 302 may instruct the private user device 302 to only present content that the private user device 304 is configured to present. For example, if the mobile device 302 detects that the private user device 304 is not configured to play back 4K video, the mobile device 302 may either convert the 4K video presented on the mobile device 302 to a format suitable for presentation on the private user device 304 or not transmit the 4K video to the private user device if the 4K video cannot be successfully converted. In some embodiments, the mobile device 302 may decrypt any secure content received from the content server 306 for presentation in an unencrypted manner on the private user device 312 and transmit the unencrypted secure content to the private user device 304 over network 312.

In some embodiments, the private user device 304 may receive the secure content from the mobile device 304 in encrypted form and may be instructed to decrypt the encrypted secure content for presentation to the user of the private user device 304 in an unencrypted manner. The private user device 304 may be instructed to generate a decryption key when it is paired (e.g., communicatively paired and/or registered) with the mobile device 302. In another implementation, the private user device 304 may receive decryption keys from the mobile device 302 to decrypt the encrypted secure content received from mobile device 302. The private user device 304 may receive the secure content in an encrypted manner from the mobile device 302. The private user device 304 may be instructed to use a decryption key to unencrypt the received encrypted secure content for presentation in an unencrypted manner on the private user device 304 along with the other unencrypted content (e.g., text box, taskbar, mobile application GUI, button, etc.) received from the mobile device 302.

In some embodiments, the mobile device 302 may transmit the content to be presented on the private user device 304 to the private user device 304 in an unencrypted manner. The mobile device 302 may decrypt any secure content received from the content source 306 and may transmit content over the network 312 to the private user device 304. In other embodiments, the mobile device 302 may encrypt the content received from the content source 306 using an encryption key that the private user device 304 also shares. The mobile device 302 may exchange such encryption key(s) with the private user device 304 when the private user device 304 is paired with the mobile device 302. Such encryption key(s) may facilitate secure communication of secure content between the mobile device 302 and the private user device 304. Once the private user device 304 receives such secure content encrypted at the mobile device 302, the private user device 304 may be instructed to decrypt the secure content and present it using its own hardware components to the authenticated user.

In some embodiments, the content presented on both the mobile device 302 and the private user device 304 may be supplemented and/or modified based on user feedback. For example, once the user is provided with content, the mobile device 302 may monitor for any user input. Once user input is received on the mobile device 302, the mobile device 302 determines if the content being presented to the user needs to be modified based on the user's received input. For example, if the mobile device 302 determines that the user has been typing in a word document displayed on the mobile device 302 and/or the private user device 304, the mobile device 302 may process the typing input received from the user and may generate a display of the additional text on the mobile device 302 and/or the private user device 304. If secure mode has been enabled on the mobile device 302 and the mobile device 302 detects user input, the mobile device 302 may encrypt the display of the text that the user is typing and display the encrypted text on the mobile device 302. The mobile device 302 may instruct the private user device 304 to display to display the text that the user is typing in an unencrypted manner. For example, the mobile device 302 may send encrypted display information including the text that the user has typed to the private user device 304. The private user device 304 may be instructed to decrypt the encrypted text using its encryption keys and generate a display of the user typed text on a user interface window already being displayed on the private user device 304.

In some embodiments, the mobile device 302 may receive user input from a user interface of the mobile device 302. For example, the user may provide user input by typing on a physical and/or virtual keypad of the mobile device 302, inputting voice commands into a microphone, and interacting with a touchscreen and/or touchpad of the mobile device 302. The mobile device 302 may also receive user input from the private user device 304. For example, the private user device may monitor the user's eye (e.g., gaze tracking) using the a camera 324 of the private user device 304 to perform certain actions in response to the user's eye movements on the various applications that are executing on the mobile user device 302 and/or the private user device 304. Additionally or alternatively, the private user device 304 may receive voice commands from an onboard microphone and/or a touch input from a touchpad and transmit such user inputs to the mobile device 302 for further processing and to generate content for presentation to the user. The mobile device 302 may also be communicatively coupled with other user interface devices (e.g., haptic feedback user input device, joystick, etc.) and receive user input from such user interface devices over network 312. The mobile device 302 may process the received user input from such user interface devices for further content generation which may then be encrypted for presentation in an encrypted manner on the mobile device 302 if the secure mode is enabled and/or on the private user device 304 in an unencrypted manner.

In some embodiments, the mobile device 302 may also present secure content in an unencrypted manner. For example, if secure mode has not been activated on the mobile user (e.g., when the mobile device 302 is located in a private environment such as an office or a private residence), the mobile device 302 may present secure content to the user in an unencrypted manner upon determining that the secure mode is deactivated. The mobile device 302 may continuously or periodically monitor whether the secure mode is activated by checking the location of the mobile device 302, the security of the network connection, and/or whether the user has manually activated secure mode. Once the mobile device 302 determines that secure mode has been activated, the secure content that the mobile device 302 was displaying in an unencrypted manner may be displayed in an encrypted manner. Content may be displayed in an encrypted manner on the mobile device 302 even if there is no private user device 304 paired with the mobile device 302.

Secure content may be received, processed, and generated for presentation to a user within various different mobile applications on the mobile device 302. In some embodiments, the mobile device 302 may access secure enterprise content within a secure operating system environment. Such a secure operation system environment on the mobile device 302 may be generated by an enterprise mobility management system on mobile device 302 that manages how enterprise mobile applications receive, process, and manipulate secure enterprise data.

Enterprise Mobility Management Architecture

Figure 4:
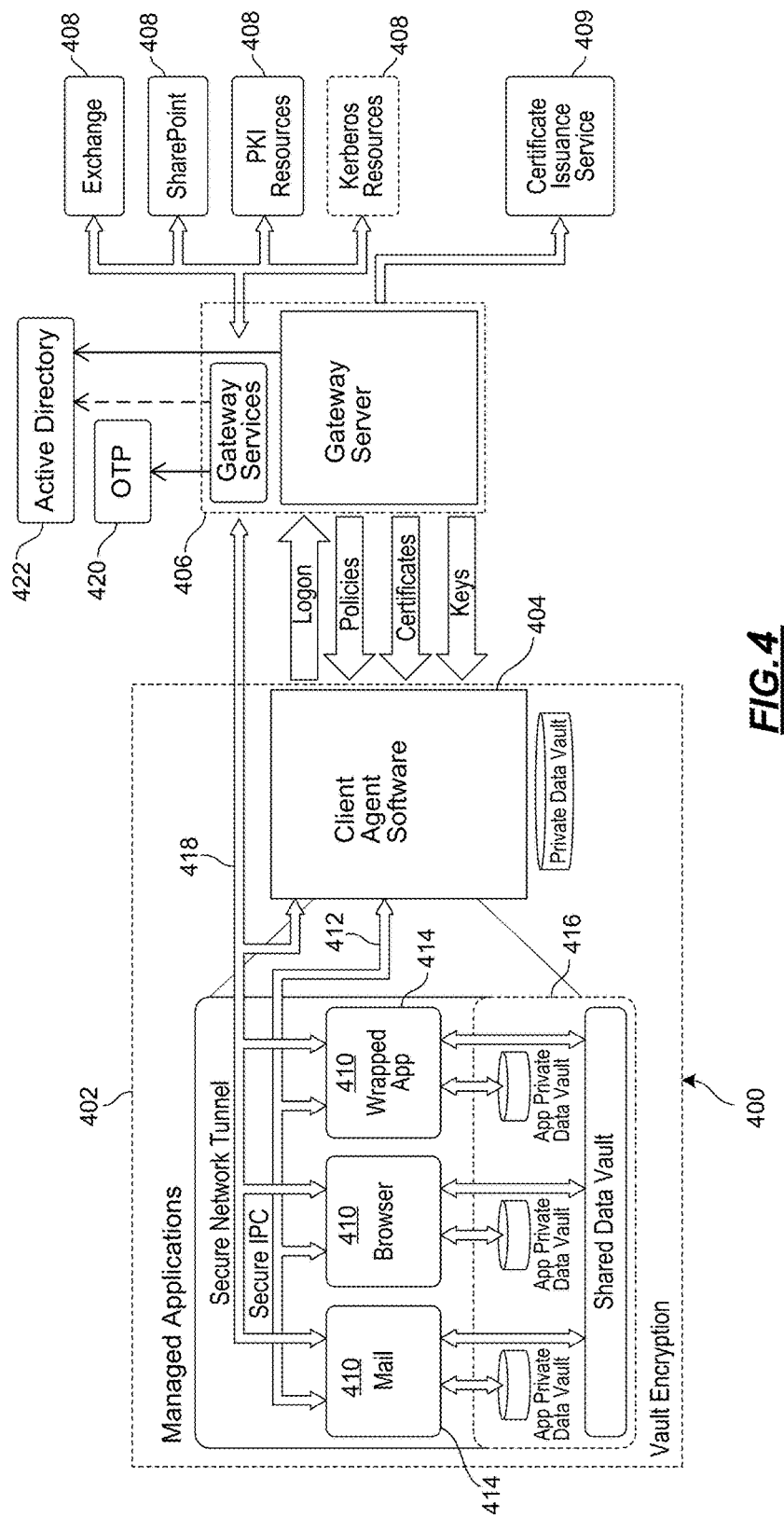
FIG. 4 depicts an illustrative enterprise mobility management system in accordance with one or more illustrative aspects described herein.

FIG. 4 represents illustrative enterprise mobility management system 400. The enterprise mobility management system 400 enables a user of a mobile device 402 to both access enterprise or personal resources from a mobile device 402 and use the mobile device 402 for personal use. The mobile device 302 may correspond to the mobile device 302 and/or private user device 304 of FIG. 3. The user may access such enterprise resources or enterprise services using a mobile device 402 that is purchased by the user or a mobile device 402 that is provided by the enterprise to user. The user may utilize the mobile device 402 to access secure enterprise content for business use only or for business and personal use. The mobile device 402 may run an iOS operating system, and Android operating system, a Windows operating system, or the like. The enterprise may choose to implement policies to manage the mobile device 402. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. The mobile device 402 that is managed through the application of mobile device management policies may be referred to as an enrolled device.

In some embodiments, the operating system of the mobile device may be separated into a managed partition and an unmanaged partition. The managed partition may have policies applied to it to secure the applications running on and data stored in the managed partition. The applications running on the managed partition may be secure applications. These applications may communicate with a secure content server such as content source 306 of FIG. 3 to retrieve secure content for presentation on the mobile device 402. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, calendar applications, web browsing applications, software-as-a-service (SaaS) access applications, Windows Application access applications, and the like. The secure applications may be secure native applications, secure remote applications executed by a secure application launcher, virtualization applications executed by a secure application launcher, and the like. The secure native applications may be wrapped by a secure application wrapper. The secure application wrapper may include integrated policies that are executed on the mobile device 402 when the secure native application is executed on the device. As yet another example, the enterprise may have an application that maintains highly secured data (e.g., human resources data, customer data, and engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device 402 may have a virtualization application that is designed to present GUIs and then record user interactions with the GUI. The application may communicate the user interactions to the server side to be used by the server side application as user interactions with the application. In response, the application on the server side may transmit back to the mobile device 402 a new GUI. For example, the new GUI may be a static page, a dynamic page, an animation, or the like, thereby providing access to remotely located resources.

An enrolled mobile device 402 with a client agent 404 may interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows applications/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (e.g., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Having discussed several examples of the computing architecture and the enterprise mobility management architecture that may be used in providing and/or implementing various aspects of the disclosure, a number of embodiments will now be discussed in greater detail.

Illustrative Embodiments

Figure 5:
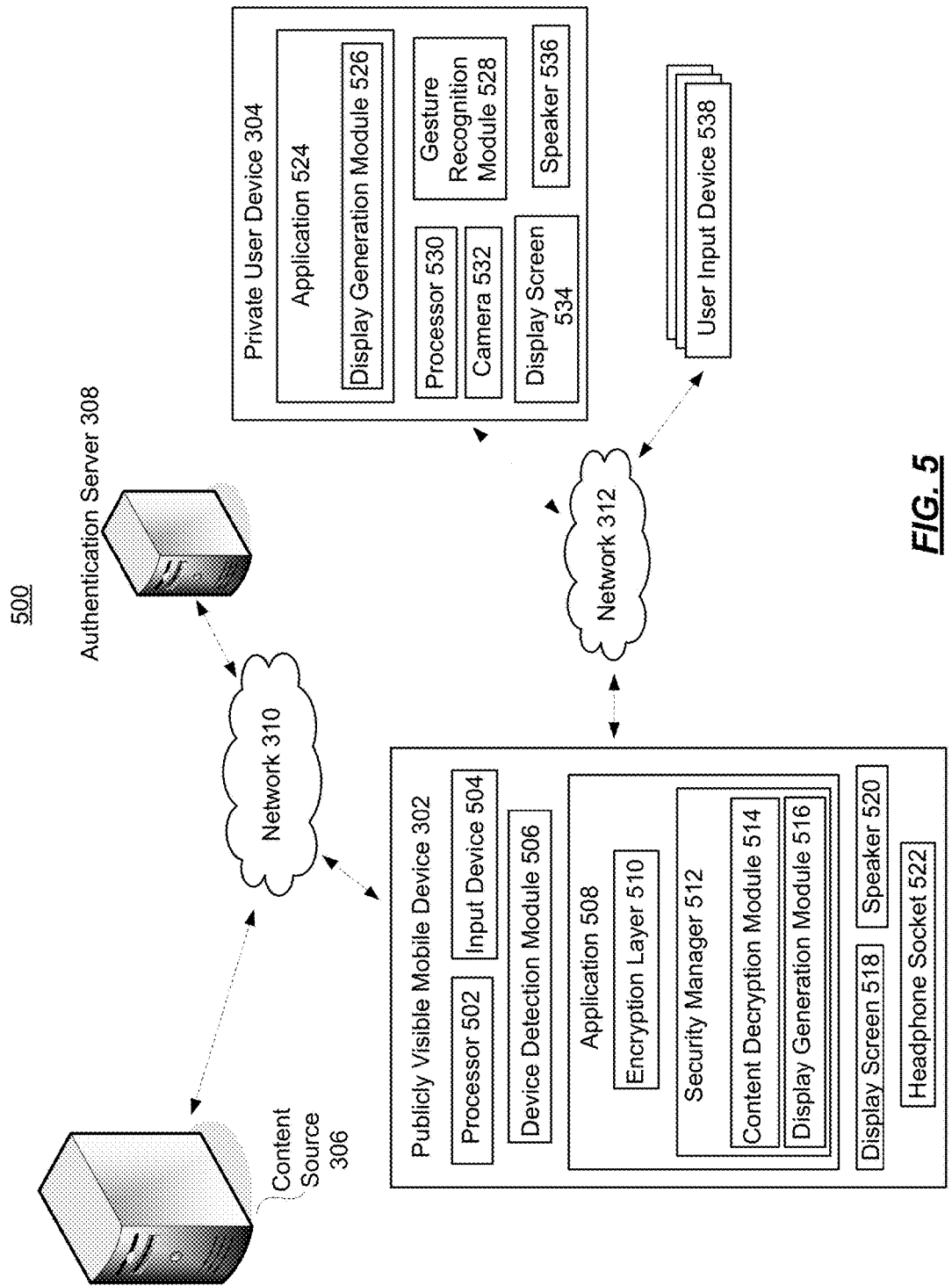
FIG. 5 is a diagram of an illustrative block diagram of the system architecture used to provide the secure content according to the one or more illustrative aspects described herein.

FIG. 5 is a diagram of an illustrative block diagram of the computing environment 500 used to provide the secure content to the publicly visible mobile device 302 and private user device 304. The block diagram illustrates various illustrative system components of the computing environment 500, several of which are located in the publicly visible mobile device 302 and private user device 304, that enable secure content to be presented to a user in a public setting according to the embodiments described herein. The publicly visible mobile device 302 may receive secure enterprise content and unsecured content over network 310 from content source 306. The mobile device 302 may present such content on the mobile device 302 and/or private user device 304. The mobile device 302 may receive user input from its own user input device 504, user input device 504, and/or private user device 304 over a local network 312. Upon receiving such user input, processor 502 of the mobile device 302 may generate content for presentation to the user through the mobile device 302 and/or the private user device 304.

In some embodiments, the user of mobile device 302 may access secure enterprise content through various different mobile applications such as application 508. Application 508, when executed on the mobile device 302, may cause the processor 508 to receive secure data and encrypt such secure data for presentation on the mobile device 508. In some embodiments, such as the embodiment illustrated in FIG. 5, the application 508 may include an encryption layer 510 and a security manager 512. The mobile device 302 may detect nearby electronic devices such as private user device 304 and user input device 538 using device detection module 506. The processor 502 may receive user input from either the input device 504 (e.g., touchpad, keyboard, microphone, camera, etc.) and determine whether any additional content for display or playback is to be generated according to the programming of application 508. Once processor 502 determines that additional content is to be generated for presentation at the user device, the processor may display such content on display screen 518 and/or output any audio content through speaker 520 and/or headphone socket 522.

In some embodiments, the publicly visible mobile device 302 may communicate with private user device 304 over network 312 (e.g., BlueTooth or WiFi). Processor 530 of the private user device 304 may process, according to instructions specified by the application 524, any instructions and information received from the mobile device 302 for content to be presented on its display screen 534 and/or speaker 536. Application 524, which may be the private user device 304's version of application 508, may instruct the processor 530 to decrypt any secure content received from the mobile device 302. A display of the content to be presented at the display screen 534 of the private user device may be generated by the display generation module 526. User inputs received at a microphone, camera 532, and/or touchpad of the private user device 304 and/or user input device 538 may be identified by a processor 530. The processor 530 of the private user device 304 may be instructed to process any user inputs received from the camera 532 and/or any user input device 538 (e.g., joystick, handheld motion sensor, etc.) using a gesture recognition module 528 to identify what the received user inputs mean within the context of application 524. The processor 530 may accordingly instruct the application 524 and/or display generation module 526 to generate content for presentation to the user based on the received and processed user inputs. Content may be outputted to the user of the private user device 304 through the display screen 534 and/or the speaker 536.

In some embodiments, the publicly visible mobile device 302 may detect the presence of private user device 304 and user input devices 538 that are located near the mobile device 302. For example, a device detection module 506 of the publicly visible mobile device 302 may monitor the presence of private user device 304 and user input devices 538 over a local network 312. The device detection module 506 may detect which devices are connected to the network 312 and determine whether each of these devices are currently paired (e.g., communicatively connected) to the mobile device 302. The device detection module 506 may instruct the processor 502 of the mobile device 302 to generate a display within application 508 a list of all devices connected to the network 512 and whether that device is paired with the mobile device 302. The user may select any private user device 304 from such a list to communicatively couple the private user device 304 to the publicly visible device 302 in order to display secure content on the private user device 304 in an unencrypted manner. Each application, such as application 508, executing on the mobile device 302 may consult the device detection module 506 to determine which devices are available to be communicatively coupled to share content displayed within that application. Each application that is attempting to display secure content may consult the device detection module 506 to determine if private user devices such as private user device 304 have been paired to the mobile user device 302 on which the application is executing. Once the device detection module 506 confirms that a private user device 304 has been paired to mobile device 302, the encryption layer 510 may authenticate the user of the private user device 304 to establish secure communication between the mobile device 302 and the private user device 304. The user of mobile device 302 may select, through a user interface in application 508, which private user device to view secure content on. In response to such a selection, the device detection module 506 may communicate with encryption layer 510 to determine if the device has been authenticated. Upon confirming user authentication, the device detection module 506 may instruct the security manager 512 to begin handling the encryption and decryption of secure content for presentation to the user on the private user device and/or the mobile device 302.

In some embodiments, the encryption layer 510 may be a component of the application 508 that handles user authentication. When a secure enterprise application is opened, the encryption layer 510 may instruct the processor 502 to prompt the user to enter authentication credentials in order to access secure content. The processor 502 of the mobile device may generate user prompts and receive authentication information (e.g., login credentials, biometric information, etc.) from the user. The encryption layer 510 may communicate with an authentication server 308 over a network 310 to authenticate the user using the received authentication information. For example, once the encryption layer 510 receives login credentials from the user, the encryption layer 510 may communicate with the authentication server 308 and generate and/or receive encryption key(s) used to decrypt the secure content that will be received from the content source 306. The authentication server 308 may include a list of users and their authentication information. Encryption layer 510 may verify that the user's authentication information matches those at the authentication server 508 through any one of several known authentication methods (e.g., using token based encryption, key based encryption, password and PIN based authentication, certificate based authentication, SMS based authentication, symmetric key authentication, public key authentication, multi-factor authentication etc.).

In some embodiments, the encryption layer 510 in the mobile device 302 may communicate with the private user device 304 to collect authentication information from the user of the private user device 304. For example, the user of the private user device 304 may also require to be authenticated to access secure content in an unencrypted manner on the private user device 304. The encryption layer 510 may instruct the processor 530 of the private user device 304 to prompt the user to provide login credentials and/or collect biometric authentication information from the user of the private user device 304 using one or more components (e.g., a microphone, camera 532, touchpad, etc.) of the private user device 304. For example, if the private user device 304 is a head mounted display device, the encryption layer 510 may instruct the processor 530 of the private user device 304 to collect an image of the user's retina using camera 532. Additionally or alternatively, the encryption layer 510 may instruct the processor 530 to generate a user prompt to enter login credentials. The user input login credentials, which may be input through a user input device 538, a user input interface of the private user device 304, and/or the input device 504 of the mobile device 302, may be collected by encryption layer 510 and used in the authentication process. Once the encryption layer 510 has collected the authentication information for the private user device 304, the encryption layer may communicate with the authentication server 308 to verify whether the user of the private user device 304 is authenticated to receive secure content on the private user device 304 in an unencrypted manner. The encryption layer 510 may also instruct the processor 530 to generate encryption keys at the private user device 304 to decrypt the secure content that it transmits to the private user device 304 for unencrypted presentation. Upon authenticating the user of the private user device 304 with the authentication server 308, the encryption layer 510 may instruct the processor 502 and/or the security manager 512 of the mobile device 302 to provide the private user device 304 with secure content for unencrypted presentation. Accordingly, the security manager 512 may process any secure content for presentation at the private user device 304 in an unencrypted manner.

The mobile device 302 may encrypt secure content received from content source 306 for presentation at both the mobile device 302 and at the private user device 304. For example, the security manager 512 may communicate with the encryption layer 510 to encrypt and decrypt secure content for presentation in both encrypted and unencrypted views. When an application 508 requests the processor 502 of the mobile device 304 to present secure content to the user, the security manager 512 (e.g., under the instructions of processor 502) may determine whether the application 508 contains secure content for presentation. The security manager 512 may further query the encryption layer 510 whether the device on which the application 508 is requesting to present the content has been authenticated. The security manager 512 may determine that at least a portion of the content to be accessed by application 508 is secure by communicating with the content source 506. The security manager 512 may further determine whether the device on which the application 508 is requesting to present the secure content is indeed a private user device that only presents content to the user. For example, the security manager 512 may communicate with the encryption layer 510 and/or private user device 304 to obtain a digital signature of the user device and check such a signature against a database of registered private user devices (e.g. personal head mounted display devices, personal virtual reality generating mobile devices, Bluetooth headsets, in-ear monitors, headphones etc.). Once the security manager 512 determines that the device on which the application 508 is requesting to present the secure content is indeed a private user device, the security manager 508 may decrypt the secure content received from content source 306 for presentation on the private user device in an unencrypted manner.

In some embodiments, instead of displaying encrypted secure content on the display screen 518, the mobile device 302 may generate a display message stating that the content the mobile device user is attempting to access is confidential and not permitted to be displayed on the mobile device 302. Additionally or alternatively, the mobile device 302 may not display the secure content and instead display a blank screen on the portion of the mobile device 302 display screen that would otherwise have displayed the secure content.

In some embodiments, the security manager 512 may decrypt secure content received from the content source 306 for display on a private user device 304. The private user device 304 may communicate with security manager 512 directly or indirectly through application 508 and may request to receive a display field. For example, the application 524 executing on the private user device 304 may indicate to the security manager 512 that a specific portion of the display area and/or presentation portion may contain secure content and the rest of the presentation area may include unsecured content. Accordingly, the security manager 512 may transmit display information to the application 524 executing on the private user device 304 such that the private user device 304 is able to generate a display of the secure content in an unencrypted manner. Once the security manager 512 receives an indication of the display area and/or presentation portion in which the secure content is to be displayed and/or presented on the private user device 304, the security manager 512 may decrypt the secure content using content decryption module 514 and generate, using the display generation module 516, a display of the secure content within the display field and/or presentation portion of the application 524. The content decryption module 514 may decrypt the secure content using encryption information exchanged with the content source 306 and/or the private user device 304. Once the content decryption module 514 has decrypted the secure content for presentation at the private user device 304, the display generation module 516 may process the secure content into a display format that may be displayed within the application 524 on the display screen 534 of the private user device 304. Additionally or alternatively, the mobile device 302 may transmit the decrypted secure content to the private user device 304 and the display generation module 526, under the instruction of the private user device's processor 530, may process the secure content received from the mobile device 302 into a display format that may be displayed within the application 524 on the display screen 534 of the private user device 304.

In some embodiments, the security manager 512 may include one or more libraries with the necessary information required to decrypt secure content received from any content source 306. The security manager 512 may both encrypt and decrypt secure content using the encryption information available at the security manager 512. The security manager 512 may comprise of one or more libraries that are a part of each application 508 on mobile device 302 that accesses secure content. In other embodiments, the security manager 512 may be integrated into the operating system of the mobile device 302 instead of being dedicated to a particular mobile application 508. Different mobile applications executing on the mobile device 302 may decrypt secure content for presentation to the user using the one or more libraries provided by the security manager 512 of the mobile device 302's operating system.

In some embodiments, the security manager 512 may be distributed across different mobile devices that are paired with each other. For example, in the example shown in FIG. 5 in which mobile device 302 is paired with private user device 304 over network 312, a portion of the security manager 512 may execute on the mobile device 302 while another portion of the security manager 512 may execute on the private user device 304. The portion of the security manager 512 that executes on mobile device 302 may decrypt the secure content upon determining that it is to transmit the content to the authenticated private user device 304 and the portion of the security manager 512 that executes on the private user device 304 may generate the display of the secure content within the application 524 using the display generation module 526. While the security manager 512 executing on the mobile device 302 may communicate with the encryption layer 510 and/or the authentication server 308 decrypt secure content, the portion of the security manager that may execute on the private user device 304 may ensure that content received at the private user device 304 from the mobile device 302 over network 312 has been completely decrypted and collect user credentials (e.g., retina scan, voice recording, etc.) for user authentication performed by the security manager 512 and/or encryption layer 510 at the mobile device 302.

In some embodiments, only certain portions of the application 508 may be presented in an encrypted manner on a publicly visible mobile device 302. For example, only a certain portion of the display screen 518 that displays an email application 508 may be encrypted. For instance, when an email application 508 is displayed on the display screen 518 of the mobile device 302, only the portion of the application 508 that displays email text (e.g., the secure content) will be encrypted and the portions of the application 508 that do not include secure content (e.g., buttons, taskbars, GUI interface, etc.) may be displayed in an ordinary unencrypted manner. The application 508 may inform the security manager 512 that secure content will be limited to particular portions of the application 508 (e.g., a text field) and accordingly, the security manager 512 may encrypt only the portions of the application 508 that have been identified to include secure content.

In some embodiments, the security manager 512 may determine whether private mode has been enabled on the mobile device 302. For example, the security manager 512 may detect whether the user is in a public location (e.g. by detecting that mobile device 302 is connected to a public network 310, the location of the mobile device 302 is outside a designated private space, etc.) and accordingly may determine that any secure content accessed by application 508 executing on the mobile device 302 is to be displayed in an encrypted manner on mobile device 302. The security manager 512 may communicate with the device detection module 506 to determine if there are any active private user devices registered with the mobile device 302 and whether secure content can be transmitted to them for presentation to the user. If such a private user device 304 is indeed available and paired with the mobile device 304, the security manager 512 may process the content (e.g., encrypt and/or decrypt the content) and transmit it to the private user device 304 for presentation within the application 524. As the application 508 and/or application 524 receives user feedback (e.g., through user input device 508, camera 532 and/or gesture recognition module 532 of the private user device 304, and/or input device 502 of the mobile device 302), the processor 502 may process the user feedback and determine whether content is to be generated for presentation to the user based on the feedback. If the processor 502 determines that such additional content is to be presented, the security manager 512 may encrypt any portion of the additional content that is to be presented within a secured portion of the application (e.g., encrypted text field of an email application) and display such encrypted additional content on the publicly visible mobile device 302 while transmitting an unencrypted version of the same additional content to the private user device 304 over network 312 for presentation on the private user device 304.

In some embodiments, the private user device 304 may be instructed to generate content received from the mobile device 302 for presentation to its user and may transmit user inputs received on it to mobile device 302. The application 524 that may execute on the private user device 304 may receive content from mobile device 302. Such content from the mobile device 302 may be formatted such that the content may be displayed at the private user device 304. If the content received from the mobile device 302 is encrypted using an encryption scheme shared by the mobile device 302 and the private user device 304, the processor 530 of the private user device 302 may decrypt such content using a decryption key that may have been established when the private user device 304 was registered with the mobile device 302. The display generation module 526 may process the received content and generate the display view that may be presented to the user on the display screen 534 of the private user device 304. The processor 530 may also output audio content to speaker 538 of the private user device 304. The display generation module 526 may process content received from the mobile device 302 into a displayable format within the framework of application 524 if the content received from the mobile device 302 is not already in such a format. The private user device 304 may monitor for any user inputs received through user input devices 538 paired with the private user device 304 or through a user input interface such as camera 532 or any other sensors of the private user device 304. The gesture recognition module 528 may process any such user inputs into actionable user commands for application 524 and/or application 508. For example, the gesture recognition module 526 may recognize that user audio input received on a microphone of the private user device 304 is to be translated into audio commands and/or audio text for the application 524 and may translate the received audio input into text commands using speech to text algorithms that can be understood by the application 524 and/or application 508. By monitoring the user's retina (e.g., eye tracking using camera 532), gestures made by the user using hand motions (e.g., using camera 532), user motion (e.g., measuring movement of the private user device using onboard motion sensors), the gesture recognition module 528 may translate such raw user input data into actionable commands that may be understood within the context of application 524 and/or application 508. Such processed user inputs may be transmitted to the mobile device 302 which may, in turn, further process such user inputs using processor 502 in order to generate additional content within the application 508 and/or application 508 which may be displayed on the mobile device 302 and/or private user device 304.

Figure 6:
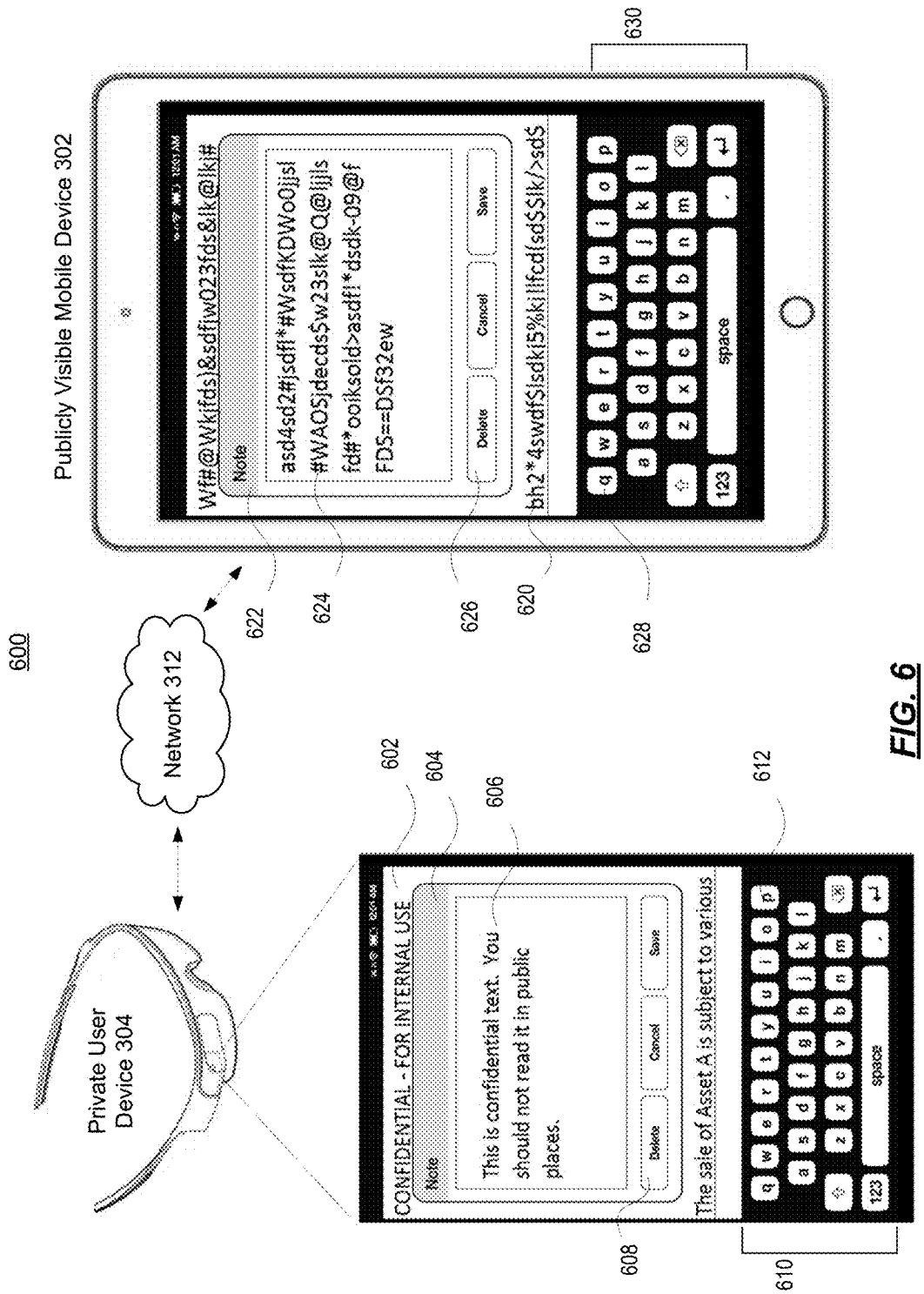
FIG. 6 is a diagram showing secure content displayed in an illustrative encrypted view on a publicly visible user device and in an illustrative unencrypted view on a private user device, in accordance with one or more illustrative aspects described herein.

FIG. 6 is a diagram showing secure content displayed in an illustrative encrypted view on a publicly visible user device and in an illustrative unencrypted view on a private user device. Once the publicly visible mobile device 302 is within a public environment, secure content that may be accessed by the mobile device 302 is presented in an encrypted view. If the mobile device 302 detects that a private user device 304 is connected to In public mode (e.g., when the mobile device 302 is in a public environment), which is illustrated in FIG. 6, publicly visible mobile device 302 may display secure content in an encrypted manner. For example, when the mobile device 302 detects that it is in a public setting, the display screen of the mobile device 302 may display encrypted text 620. For example, an application running on the mobile device 302 may display secure content as encrypted text 620. Graphic user interfaces such as pop-up window 622 may be displayed on the display screen of the mobile device 302 with secure content displayed in an encrypted manner such as encrypted window text 624. Non-secure content such as the graphic user elements of a mobile application (e.g., button 626) may be displayed in an unencrypted manner even when the device 302 is in a public mode. Other graphic elements such as buttons 628 of an on-screen keyboard 630 may also be displayed in an unencrypted manner while the mobile device 302 is in a public setting. By displaying such non-secure elements that do not contain enterprise data in a plain unencrypted manner, the user is able to reasonably discern the user interface elements even in a public environment while preventing secure content to be displayed to bystanders, thereby improving user experience while maintaining data security.

Once the private user device 304 is communicatively coupled to the publicly visible mobile device 302, the mobile device 302 may transmit information to the private user device 304 over network 312 to present secure content in an unencrypted manner. The private user device 304 may be instructed to generate a display of a mobile application accessing secure content. The private user device 304 may be instructed to duplicate the display of the mobile application that is presented on the mobile device 302 with portions, which were displayed on the mobile device 302 in an encrypted manner, in an unencrypted manner on the private user device 304. For example, the private user device 304 may be instructed to execute a mobile application (and/or a counterpart mobile application) that displays text 602 in an unencrypted manner. The text 602 displayed on the private user device 304 may correspond to the encrypted secure text 620 on the mobile device 302. Upon determining that a mobile application on the publicly visible mobile device 302 is accessing secure content, the security manager executing on the mobile device 302 may instruct the mobile device 302 to display the text 620 (e.g., the secure content) in an encrypted manner and may also instruct the private user device 304 to simultaneously generate an unencrypted display of the same text as unencrypted text 602 on its own display screen. Similarly, the private user device 304 may be instructed to display graphic user interfaces such as pop-up window 604 which is analogous to the pop-up window 622 displayed on the mobile device 302. Non-secure content such as graphic user element 608 (e.g. a button) may be displayed on the private user device 304 in an unencrypted manner similar to the unencrypted display of the button 626 on the mobile device 302. Secure content that is displayed in an encrypted manner on the mobile device 302 within pop-window 622 (e.g., encrypted window text 624) may be displayed in an unencrypted manner on the private user device as unencrypted window text 606 within pop-up window 604. However, any graphic elements such as buttons 612 on the keyboard 610 (e.g., which correspond to buttons 628 of an on-screen keyboard 630 displayed in an unencrypted manner on mobile device 302) that do not present secure content may also be displayed in an unencrypted manner on the private user device 304.

By simultaneously displaying the same mobile application on both the mobile device 302 and on the private user device 304 with the mobile device 302 displaying encrypted text 620 and the private user device 304 displaying unencrypted text 602 corresponding to the encrypted text 620, the mobile device 302 provides a seamless dual display experience. Such a dual display experience allows the user of the mobile device 302 (and/or the user of the private user device 304) to be able to access secure content in a public environment in an accessible and unencrypted format only from the private user device 304 while displaying the same content on the mobile device 302 only encrypting the secure content. Such a dual display may provide the user to be able to monitor that his interactions with the content generate the same effects on the mobile device 302 as they do on the private user device 304.

Figure 7A:
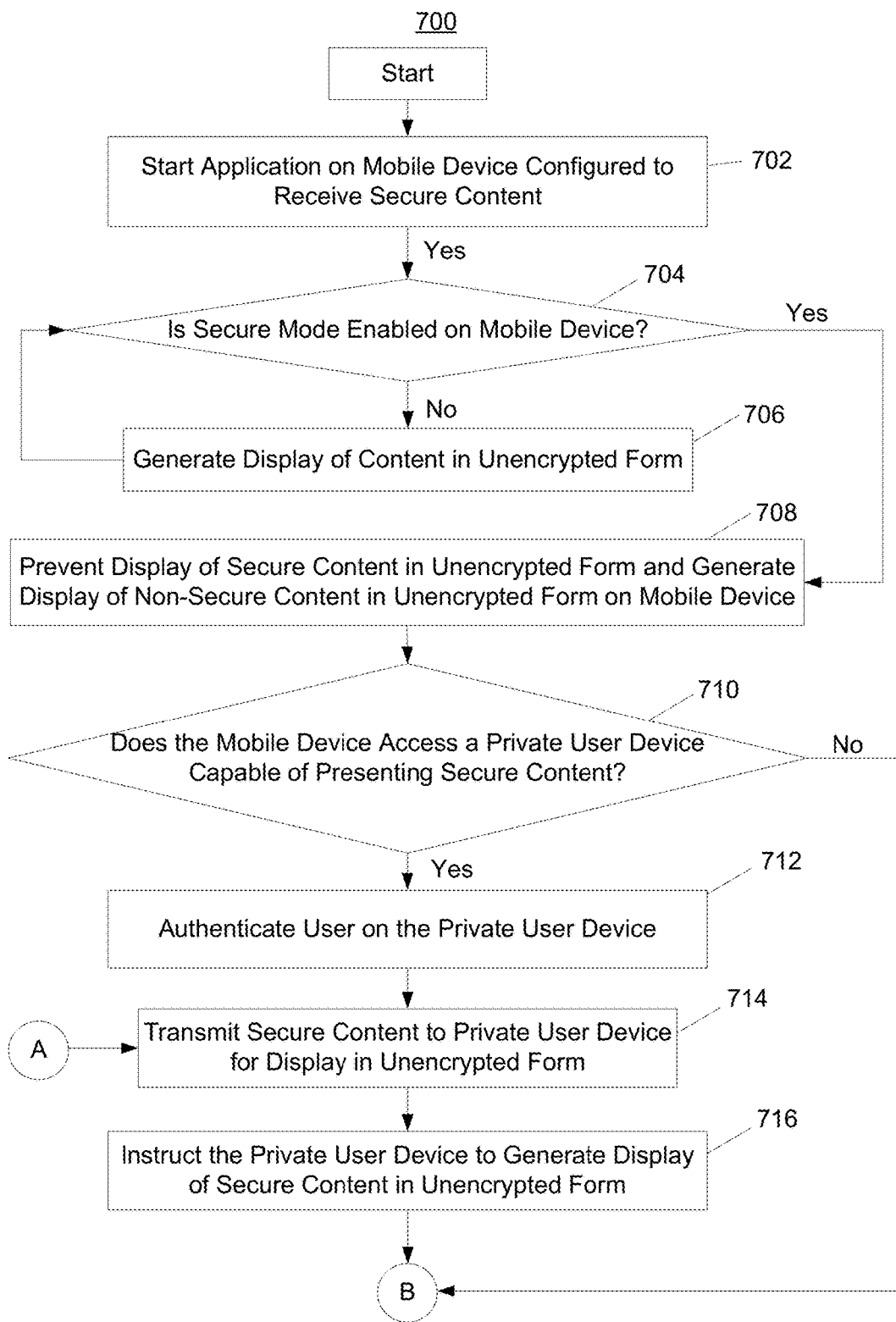
FIGS. 7A and 7B depict flowcharts that illustrate a method for presenting secure content to the intended user in a public setting in accordance with one or more illustrative aspects described herein.
Figure 7B:
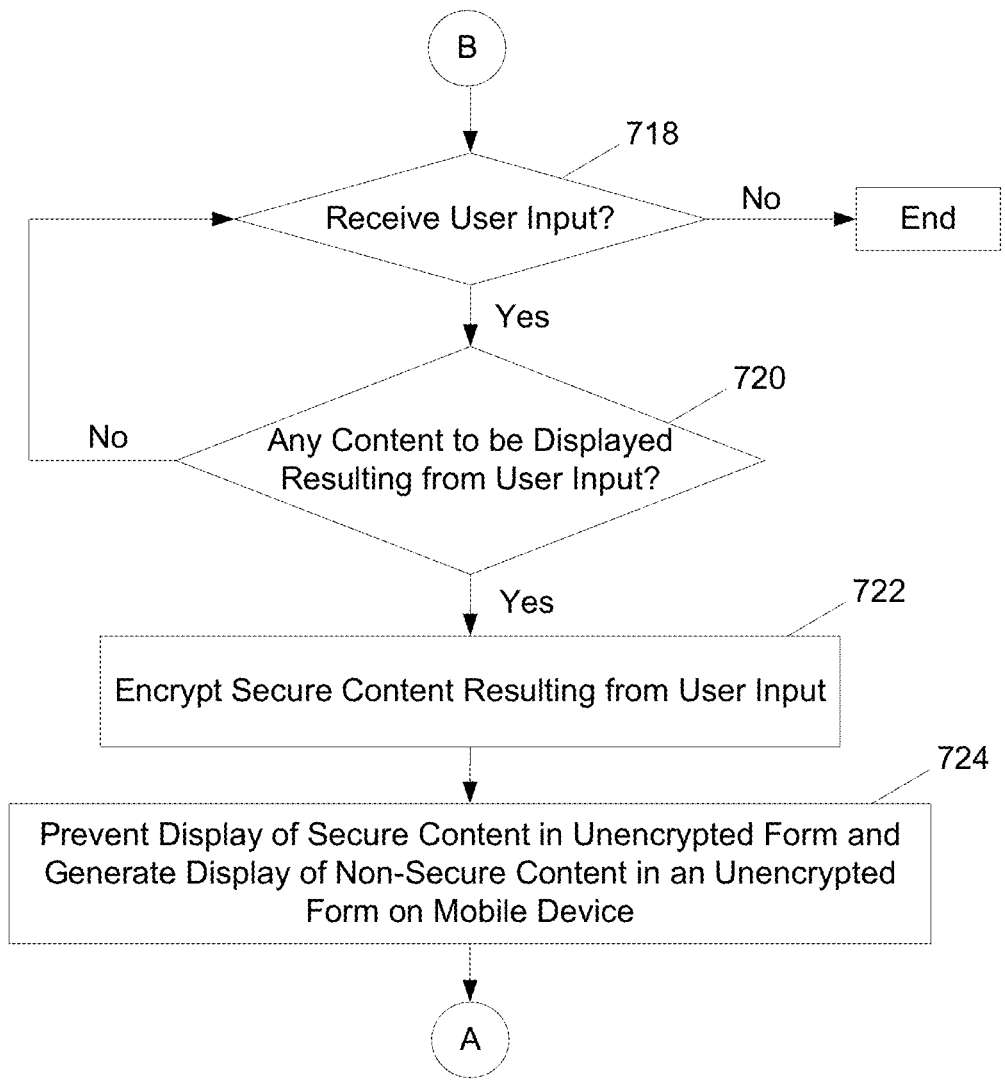

FIGS. 7A and 7B depict flowcharts that illustrate a method for presenting secure content to the intended user in a public setting. In one or more embodiments, the method of FIGS. 7A and 7B and/or one or more steps thereof may be performed by the processor of a mobile computing device (e.g., generic computing device 201 described in FIG. 2, and publicly visible mobile device 302 described in FIGS. 3-6). In some embodiments, the method of FIGS. 7A and 7B and/or one or more steps thereof may be performed by the processor of a mobile computing device (e.g., generic computing device 201, and publicly visible mobile device 302) and the processor of a private user device 304 described in FIGS. 3-6. In other embodiments, the method illustrated in FIGS. 7A and 7B and/or one or more steps thereof may be embodied in computer-executable instructions that are stored in a computer-readable medium, such as a non-transitory computer-readable memory.

As seen in FIG. 7A, the method 700 may begin at step 702 in which a mobile device may start an application configured to receive secure content. For example, the method 700 may begin when an enterprise mobile application (e.g., enterprise email application, enterprise web browser, or any mobile application configured to access secure enterprise data from an enterprise server) is initiated on the mobile device. Upon detecting that such a mobile application has been initiated, the mobile device may initiate steps 704-724 of method 700.

At step 704, it may be determined whether a secure mode has been enabled on the mobile device. The mobile device may detect whether a secure mode, which specifies that any secure content accessed by the mobile device should be presented in an encrypted form, has been enabled on the mobile device. The mobile device may detect activation of the secure mode through several different techniques. For example, the user may manually activate a secure mode by selecting an option within a mobile application or in the mobile device's settings to activate such a secure mode. Additionally or alternatively, secure mode may be activated when the mobile device is connected to a public network (e.g., a network that is not recognized as one of the private networks that a device has previously registered with). Additionally or alternatively, secure mode may be activated upon detecting that the mobile device's location is outside of a geographic area associated with a private environment (e.g., home and/or office). Such determinations may automatically enable secure mode on the device because these situations may place the mobile device in a public setting where secure content may be inadvertently consumed by bystanders.

At step 706, in response to determining that secure mode has not been enabled on the mobile device, content may be displayed in an unencrypted form on the mobile device. If secure mode is not activated (e.g., the user is consuming content on the mobile device in a private setting such as a home or office), all content presented on the mobile device may be presented in an unencrypted manner. For example, a security manager executing on the mobile device may determine that the mobile device is in a private environment and accordingly may present secure content retrieved from a content server (e.g., remote enterprise server) on the mobile device without encrypting the content. Upon presenting content in an unencrypted form without secure mode enabled, the mobile device may return to step 704 to determine whether a secure mode has been enabled. Such a determination of whether secure mode has been activated may be made periodically when secure mode has not been enabled.

At step 708, in response to determining that secure mode has been enabled on the mobile device, the mobile device may prevent secure content from being displayed on the mobile device in an unencrypted form and may generate the display of non-secure secure content user interface elements on the mobile device in an unencrypted form. For example, the security manager executing on the mobile device may encrypt secure content received from a content source. Additionally or alternatively, the mobile device may generate a display message stating that the content the mobile device user is attempting to access is confidential and not permitted to be displayed on the mobile device. Additionally or alternatively, the mobile device may not display the secure content and instead display a blank screen on the portion of the mobile device display screen that would otherwise have displayed the secure content. A display generation module (e.g., part of the application or the operating system of the mobile device) may generate a composite display of the encrypted secure content encrypted by the security manager along with the unencrypted non-secure content (e.g., GUI elements, other application data and elements generated for display by the operating system of the mobile device, etc.) for presentation on the mobile device. If there is any audio content to be presented to the user and no headphones have been plugged into the mobile device (e.g., the audio content is to be played back on the mobile device's speakers), the mobile device may encrypt any secure content included in the audio content and play back the composite audio content including unencrypted non-secure audio content along with encrypted secure audio content.

At step 710, it may be determined whether the mobile device has access to a private user device that is capable of presenting secure content to a user. For example, the mobile device may determine whether a private user device has been communicatively coupled (e.g., registered) with the mobile device. A user of the mobile device may select a private user device for registration with the mobile device from a list of devices that are available on one of the plurality of networks that the mobile device is connected to. Such a list of available private user devices may be displayed within a mobile application or by the operating system of the mobile device within a settings menu on the mobile device. Once a private user device is registered with the mobile device, encryption information may be exchanged for secure communication between the mobile device and the private user device. Additionally or alternatively, other protocols and/or libraries may be exchanged between the private user device and the mobile device that enables the mobile device to instruct the private user device to present content received from a content source and/or content that is being presented on the mobile device itself in an unencrypted form. If it is determined that the mobile device does not have access to a private user device capable of presenting secure content to the user, the method 700 may proceed to step 718 to determine if user input is received.

At step 712, in response to determining that the mobile device does have access to a private user device capable of presenting secure content to the user, the user of the private user device may be authenticated. For example, the mobile device may instruct the private user device to prompt its user to enter login information. Login information (e.g., authentication credentials, biometric information, etc.) collected by the private user device may be transmitted to the mobile device. The encryption layer of a mobile application executing on the mobile device may use the login information received from the private user device to communicate with an encryption server to determine if the user of the private user device is authenticated and whether the user of the private user device is allowed access to the secure content presented within the mobile application.

At step 714, the secure content may be transmitted to the private user device for presentation to the user in an unencrypted form. Once the user of the private user device has been authenticated to access the secure content, the mobile device may transmit both secure and non-secure content contained within the mobile application to the private user device for presentation to its user. The mobile device may send such transmission using an encryption scheme established between the private user device and the mobile device during registration of the private user device. For example, the mobile device may decrypt any encrypted content received from the content source and before transmitting such decrypted secure content to the private user device, the mobile device may encrypt the secure content using an encryption scheme that the private user device will be able to decrypt. Accordingly, the private user device will be able to securely receive and extract unencrypted secure content for presentation to the user. The mobile device may also transmit non-secure content to the private user device in a similar manner. Additionally or alternatively, the mobile device may transmit non-secure content to the private user device without any encryption to minimize decryption time and processing power at the private user device.

At step 716, the mobile device may instruct the private user device to generate a display of the secure content may be generated in an unencrypted form. Once the private user device has received content from the mobile device, the mobile device may instruct the private user device to decrypt any content encrypted by the mobile device for secure communications using encryption information established with the mobile device during device registration. Once the secure content is available on the private user device in a decrypted form, the mobile device may instruct the private user device to combine the secure content with other non-secure elements received from the mobile device using instructions received from the mobile device. For example, the secure content may be generated for presentation within the context of the mobile application and other non-secure elements. For example, secure email text may be generated for display in an unencrypted format along with the non-secure email client GUI and text. The mobile device may instruct the private user device to generate a display of the visual content on the display screen of the private user device (e.g., by converting the generated display information into optical signals and outputting such signals from a projector onto the display screen of the personal user device). The mobile device may instruct the private user device to play back audio content through headphones or speakers of the private user device.

At step 718, it may be determined whether user input is received. The processor of the mobile device and/or the processor of the private user device may monitor whether any user input has been received at the mobile device and/or the private user device. The user may provide audio, video, or gesture based input to the mobile device and/or the private user device directly or indirectly through a user input device communicatively coupled to the mobile device and/or the private user device. If user input is received at the private user device, the user input may be processed by the processor of the private user device into an input that corresponds to the context of the mobile application. The mobile device may receive, from the private user device, the user input and information indicating the significance of the user input within the context of the mobile application for which the user input was received. The mobile device may collect user inputs from a variety of sources including its own user interface. If no user input is received, the method 700 may end.

At step 720, in response to determining that user input is received, it may be further determined whether the user input results in additional and/or different content to be displayed. Once the mobile device has collected various different inputs, the mobile device may determine what additional content is to be generated in response to the user input. For example, if the user provides an input into an email application by typing additional keywords, the mobile device (e.g., the processor of the mobile device) may determine that additional text corresponding to the user typing input should be displayed within the email application displayed on both the mobile device and the private user device. The mobile device may process the user input and according to the programming and/or instructions of each mobile application for which the user input is received, the mobile device may determine what additional content needs to be generated for presentation to the user. If it is determined that the user input does not result in any different content for display, the method 700 may return to step 718 to monitor for further user input.

At step 722, in response to determining that the user input results in additional and/or different content to be displayed, any secure content resulting from the user input may be encrypted. The mobile device presenting the content of the mobile application generated for display to the user may also present the secure content resulting from the user input. Accordingly, when the mobile device is in a secure mode, the mobile device may encrypt all secure content (including the secure content generated in response to the user input) for displaying and/or presenting the secure content in an encrypted manner on the mobile device. In order to encrypt secure content based on the user input, the mobile device may determine whether the content generated in response to the user input falls within an area of the mobile application that is previously encrypted on the mobile device in secure mode (e.g., an encrypted text field or encrypted display area). In the example of the email application, if the user typing input generates additional content within an email draft that is previously encrypted by virtue of text within the email draft window being encrypted (e.g., the email window is an encrypted text field), the mobile device may encrypt the additional text generated as a result of the user typing input for display as encrypted text within the mobile email application.

At step 724, the mobile device may prevent the display of secure content from being generated in an unencrypted form and may generate the display of non-secure content in an unencrypted form. Once the resulting content from the user input received at the mobile device has been generated and the secure content from the resulting content has been encrypted, the mobile device may generate a combined display of the encrypted secure content along with the unencrypted non-secure content on the mobile device. Additionally or alternatively, the mobile device 302 may generate a display message stating that the content the mobile device user is attempting to access is confidential and not permitted to be displayed on the mobile device 302. Additionally or alternatively, the mobile device 302 may not display the secure content and instead display a blank screen on the portion of the mobile device 302 display screen that would otherwise have displayed the secure content. A display generation module may generate a composite display of the encrypted secure content resulting from the user input along with the unencrypted non-secure content resulting from the user input (e.g., GUI elements, other application data and elements generated for display by the operating system of the mobile device, etc.) for presentation on the mobile device. If there is any audio content to be presented to the user based on the user input and no headphones have been plugged into the mobile device, the mobile device may encrypt any secure content included in the audio content and play back the composite audio content including unencrypted non-secure audio content along with encrypted secure audio content.

Once content resulting from the user input has been generated for display on the mobile device, the method 700 may return to step 714 to transmit the secure content resulting from the user input to the private user device for display in an unencrypted form. The non-secure content generated from the user input may also be transmitted to the private user device for display along with the unencrypted display of the secure content. Once the secure content is available on the private user device in a decrypted form, the private user device may be instructed by the mobile device to combine the secure content with other non-secure elements received from the mobile device using instructions received from the mobile device. For example, the secure content may be generated for presentation within the context of the mobile application and other non-secure elements.

Although the subject matter has been described in language specific to structural features and/or methodological acts, it is to be understood that the subject matter defined in the appended claims is not necessarily limited to the specific features or acts described above. Rather, the specific features and acts described above are described as illustrative implementations of the following claims. It is to be understood that the above disclosure is illustrative only. The following illustrative embodiments are representative only, and not intended to be limiting in any respect.

What is claimed is:

1. A method comprising:
   receiving, at a mobile computing device, secure enterprise content;
   determining, by the mobile computing device, whether the secure enterprise content is being accessed on the mobile computing device;
   responsive to determining that the secure enterprise content is being accessed on the mobile computing device:
      identifying that the mobile computing device is connected to a public network;
      responsive to identifying that the mobile computing device is connected to the public network, preventing, by the mobile computing device, the secure enterprise content from being presented in an unencrypted form on the mobile computing device;
      encrypting, by the mobile computing device, the secure enterprise content for presentation in an encrypted form on the mobile computing device;
      determining, by the mobile computing device, whether a private user device is communicatively coupled to the mobile computing device; and
      responsive to determining that the private user device is communicatively coupled to the mobile computing device, transmitting, by the mobile computing device, the secure enterprise content to the private user device via the public network to generate the secure enterprise content for presentation in an unencrypted form on the private user device.

2. The method of claim 1, wherein the private user device comprises a head-mounted display device configured to place a display screen in physical proximity to a wearer's eye and visible only to the wearer.

3. The method of claim 1, further comprising generating non-secure content for presentation in an unencrypted form on the mobile computing device.

4. The method of claim 1, wherein the encrypting the secure enterprise content for presentation in an encrypted form on the mobile computing device further comprises:
   generating a blank area on a display screen of the mobile device, wherein the blank area is generated on an area of the display screen of the mobile device corresponding to the secure enterprise content.

5. The method of claim 1, wherein the secure enterprise content is encrypted for presentation in the encrypted form in response to:
   determining that the mobile computing device is in a public environment; and
   determining that a secure mode to encrypt secure enterprise content on the mobile computing device has been enabled.

6. The method of claim 1, wherein encrypting the secure enterprise content for presentation in the encrypted form further comprises:
   determining that content is to be presented on the mobile computing device;
   determining a portion of the content to be presented on the mobile computing device that comprises the secure enterprise content; and
   encrypting the portion of the content to be presented that comprises the secure enterprise content.

7. The method of claim 1, further comprising:
   instructing the private user device to collect authentication information from a wearer of the private user device;
   receiving the authentication information from the private user device; and
   using the authentication information received from the private user device to authenticate the wearer of the private user device.

8. The method of claim 1, wherein instructing the private user device to generate the secure enterprise content for presentation in an unencrypted form comprises:
   determining that a wearer of the private user device has been authenticated;
   generating the secure enterprise content into an unencrypted presentable form; and
   transmitting the secure enterprise content to the private user device.

9. The method of claim 1, further comprising:
   determining whether any additional content is to be generated for presentation based on a received user input;
   responsive to determining that additional content is to be generated based on the received user input, determining which portion of the additional content generated for presentation comprises additional secure enterprise content;

encrypting the portion of the additional content to be presented that comprises the additional secure enterprise content; and generating the additional secure enterprise content for presentation in an encrypted form on the mobile computing device.

10. The method of claim 9, further comprising:

determining that a wearer of the private user device has been authenticated;

generating the additional secure enterprise content into an unencrypted presentable form; and transmitting the additional secure enterprise content to the private user device for presentation in an unencrypted form.

11. An apparatus comprising:

at least one processor;

at least one display screen; and at least one memory storing computer-readable instructions that, when executed by the at least one processor, cause the apparatus to:

receive secure enterprise content;

determine whether the secure enterprise content is being accessed on the apparatus;

responsive to determining that the secure enterprise content is being accessed on the apparatus:

identify that the apparatus is connected to a public network;

responsive to identifying that the apparatus is connected to the public network, prevent the secure enterprise content from being presented in an unencrypted form on the apparatus;

encrypt the secure enterprise content for presentation in an encrypted form on the apparatus;

determine whether a private user device is communicatively coupled to the apparatus; and responsive to determining that the private user device is communicatively coupled to the apparatus, transmit the secure enterprise content to the private user device via the public network to generate the secure enterprise content for presentation in an unencrypted form on the private user device.

12. The apparatus of claim 11, wherein the instructions, when executed by the at least one processor, cause the apparatus to encrypt the secure enterprise content for presentation in an encrypted form on the apparatus by further causing the apparatus to:

generate a blank area on the at least one display screen of the apparatus, wherein the blank area is generated on an area of the at least one display screen of the apparatus corresponding to the secure enterprise content.

13. The apparatus of claim 11, wherein the instructions, when executed by the at least one processor, cause the apparatus to encrypt the secure enterprise content for presentation in an encrypted form by further causing the apparatus to:

determine that the apparatus is in a public environment; and determine that a secure mode to encrypt secure enterprise content on the apparatus has been enabled.

14. The apparatus of claim 11, wherein the instructions, when executed by the at least one processor, further cause the apparatus to generate non-secure content for presentation in an unencrypted form on the apparatus.

15. The apparatus of claim 11, wherein the instructions, when executed by the at least one processor, cause the apparatus to encrypt the secure enterprise content for presentation in an encrypted form by further causing the apparatus to:

determine that content is to be presented on the apparatus;

determine a portion of the content to be presented on the apparatus comprises the secure enterprise content; and encrypt the portion of the content to be presented that comprises the secure enterprise content.

16. The apparatus of claim 11, wherein the instructions, when executed by the at least one processor, further cause the apparatus to:

instruct the private user device to collect authentication information from a wearer of the private user device;

receive the authentication information from the private user device; and use the authentication information received from the private user device to authenticate the wearer of the private user device.

17. The apparatus of claim 11, wherein the instructions, when executed by the at least one processor, cause the apparatus to generate the secure enterprise content for presentation in an unencrypted form on the private user device by further causing the apparatus to:

determine that a wearer of the private user device has been authenticated;

generate the secure enterprise content into an unencrypted presentable form; and transmit the secure enterprise content to the private user device.

18. The apparatus of claim 11, wherein the instructions, when executed by the at least one processor, further cause the apparatus to:

determine whether any additional content is to be generated for presentation based on a received user input;

responsive to determining that additional content is to be generated based on the received user input, determine which portion of the additional content generated for presentation comprises additional secure enterprise content;

encrypt the portion of the additional content to be presented that comprises the additional secure enterprise content; and generate the additional secure enterprise content for presentation in an encrypted form on the apparatus.

19. The apparatus of claim 18, wherein the instructions, when executed by the at least one processor, further cause the apparatus to:

determine that a wearer of the private user device has been authenticated;

generate the additional secure enterprise content into an unencrypted presentable form; and transmit the additional secure enterprise content to the private user device for presentation in an unencrypted form.

20. One or more non-transitory computer readable media storing executable instructions that, when executed, cause a computing device to:

receive secure enterprise content;

determine whether the secure enterprise content is being accessed on the computing device;

responsive to determining that the secure enterprise content is being accessed on the computing device:

identify that the computing device is connected to a public network;

responsive to identifying that the computing device is connected to the public network, prevent the secure enterprise content from being presented in an unencrypted form on the computing device;
encrypt the secure enterprise content for presentation in an encrypted form on the computing device;
determine whether a private user device is communicatively coupled to the computing device; and
responsive to determining that the private user device is communicatively coupled to the computing device, transmit the secure enterprise content to the private user device via the public network to generate the secure enterprise content for presentation in an unencrypted form on the private user device.

\* \* \* \* \*